in United States Patent  (10) Patent No.: US 12,428,021 B2
Cohen et al.  (45) Date of Patent: Sep. 30, 2025

(54) GESTURE RECOGNITION SYSTEM FOR AUTONOMOUS VEHICLE TRAFFIC CONTROL

(71) Applicant: Cybernet Systems Corp., Ann Arbor, MI (US)

(72) Inventors: Charles J. Cohen, Ann Arbor, MI (US); Charles Jacobus, Ann Arbor, MI (US); Glenn Beach, Ypsilanti, MI (US); George Paul, Belleville, MI (US)

(73) Assignee: Cybernet Systems Corp., Ann Arbor, MI (US)

( * ) Notice: Subject to any disclaimer, the term of this patent is extended or adjusted under 35 U.S.C. 154(b) by 262 days.

(21) Appl. No.: 17/992,635

(22) Filed: Nov. 22, 2022

(65) Prior Publication Data

US 2023/0219597 A1 Jul. 13, 2023

Related U.S. Application Data

(60) Provisional application No. 63/282,068, filed on Nov. 22, 2021.

(51) Int. Cl.
*B60W 60/00* (2020.01)
*G06V 20/56* (2022.01)
*G06V 40/20* (2022.01)

(52) U.S. Cl.
CPC .......... *B60W 60/001* (2020.02); *G06V 20/56* (2022.01); *G06V 40/28* (2022.01); *B60W 2554/20* (2020.02); *B60W 2554/40* (2020.02)

(58) Field of Classification Search
None
See application file for complete search history.

(56) References Cited

U.S. PATENT DOCUMENTS

| | | | | |
|---|---|---|---|---|
| 11,975,739 | B2 * | 5/2024 | Kucharski | H04W 4/023 |
| 2008/0218996 | A1 * | 9/2008 | Galloway | G08B 5/006 |
| | | | | 315/291 |
| 2017/0364072 | A1 * | 12/2017 | Yako | B60W 60/00253 |
| 2018/0012427 | A1 * | 1/2018 | Ricci | G01C 21/36 |
| 2018/0304854 | A1 * | 10/2018 | Chen | H04M 1/724098 |
| 2019/0113916 | A1 * | 4/2019 | Guo | A61B 5/6893 |
| 2019/0258253 | A1 * | 8/2019 | Tremblay | G01C 21/3617 |
| 2020/0276973 | A1 * | 9/2020 | Meijburg | G08G 1/096816 |
| 2020/0377119 | A1 * | 12/2020 | Khlifi | G01S 13/931 |
| 2020/0394393 | A1 * | 12/2020 | Kraft | G06V 40/28 |

(Continued)

*Primary Examiner* — Daniel L Greene
*Assistant Examiner* — Robert L Pinkerton
(74) *Attorney, Agent, or Firm* — Fishman Stewart PLLC

(57) ABSTRACT

An autonomous vehicle (an AV, or manual vehicle in an autonomous or semi-autonomous mode) includes the ability to sense a command from a source external to the vehicle and modify the behavior of the vehicle in accordance with the command. For example, the vehicle may visualize a police officer or other person associated with traffic control and interpret gestures made by the person causing the vehicle to stop, slow down, pull over, change lanes, back up or take a different route due to unplanned traffic patterns such as accidents, harsh weather, road closings or other situations. The system and method may also be used for non-emergency purposes, including external guidance for load pick-up/placement, hailing a vehicle used as a cab, and so forth. The command may further be spoken or may include a radio frequency (RF) light or other energy component.

14 Claims, 5 Drawing Sheets

(56) References Cited

U.S. PATENT DOCUMENTS

| | | | |
|---|---|---|---|
| 2021/0012100 A1* | 1/2021 | Hoffmann | G06F 18/214 |
| 2021/0089055 A1* | 3/2021 | Tran | G06N 3/08 |
| 2021/0158700 A1* | 5/2021 | Mao | G06V 20/56 |
| 2023/0140569 A1* | 5/2023 | Foster | B60W 30/18159 |
| | | | 701/400 |
| 2023/0379430 A1* | 11/2023 | Han | H04N 23/667 |

* cited by examiner

Figure 3. Interpretation of gestures to direct vehicle behaviors (to be executed by the vehicle architecture)

GESTURE RECOGNITION SYSTEM FOR AUTONOMOUS VEHICLE TRAFFIC CONTROL

REFERENCE TO RELATED APPLICATIONS

This Application claims priority to and the benefit of U.S. Provisional Patent Application Ser. No. 63/282,068, filed Nov. 22, 2021, the entire content of which is incorporated herein by reference.

FIELD OF THE INVENTION

This invention relates generally to autonomous vehicles and, in particular, to a gesture recognition system for autonomous control.

BACKGROUND OF THE INVENTION

The field of autonomous vehicles is expanding to include road trucks, delivery vehicles, warehouse, material handling, and manufacturing transport vehicles, driverless taxis, and driverless consumer vehicles. These autonomous and semi-autonomous vehicles can offer both manual and automated control modes to passengers/drivers. Autonomy enables these vehicles to obey basic traffic rules (for instance stopping at intersections or maintaining speed on the roadway), to plan and execute complex driving paths from an origin to a destination point, and to slow, stop, or in some cases, move around obstacles or other vehicles.

What the state of the art of autonomous vehicles has not adequately demonstrated is complex behaviors that can cope with unusual circumstances like accident scenes, construction zones, circumstances where complex traffic flow control is made by a manual traffic director (for instance a policeman directing traffic at an intersection, workman directing traffic at a construction site, or police directing traffic around a traffic stop or accident scene), or any other similar situation.

In a consumer vehicle, these circumstances might be handled by transferring vehicle control safely to a person in the vehicle (likely the driver). However, in a fully autonomous system like might be employed in a long-haul highway trick, an autonomous taxi, or an autonomous material handing vehicle (in factory or warehouses), there will be not driver to respond to these unique circumstances.

One solution for this problem will be to provide means for the human traffic director to authenticate to the autonomous vehicle (i.e. demonstrate his/her authority to direct traffic), and then present driving commands (i.e. select autonomous vehicle behaviors that implement correct driving in the circumstance) that the vehicle executes.

The solution disclosed here is to use recognition of the traffic directing person to authenticate this authority and to recognize gestures that the person makes to select the correct circumstance-specific autonomous behaviors. Such gestures may include the gestures as first summarized in U.S. Pat. No. 6,681,031 and subsequently in U.S. Pat. Nos. 6,950,534, 7,036,094, 7,460,690, 7,668,340, 8,407,625, and 9,304,593. These are body positions, movements of the body, and often hand location, hand signals, and hand motion that have intentional meaning (i.e. are recognized as commands to specific actions). One set of these gestures defined for military movement of vehicles is described in Army Field Manual No. 21-60 and as shown in FIGS. 9-14 most recently in U.S. Pat. No. 9,304,593 and in the other figures in the afore reference prior patents.

As a back-up to the gesture recognition of commands, a system to support manual commands to autonomous vehicles might employ vehicle-to-vehicle communications and vehicle-to-pedestrian communication through an RF link like that described in U.S. Pat. No. 10,909,866, and patent applications 2021/0248915, 2021/0110726, 2021/0104165, and 2021/0082296. This link would implement both authentication of authority to command and would support the traffic directing person to select the command sent to the autonomous vehicle.

Use of gestures to control vehicles has been described for a number of alternative applications in prior art. U.S. Pat. No. 7,050,606 described using gestures by a person inside the vehicle to control vehicle functions such as control of comfort or entertainment features like the heater, air conditioner, lights, mirror positions, the radio/CD player, automatic adjustment of car seating restraints based on head position, or when to fire an airbag (and at what velocity or orientation) based on the position of a person in a vehicle seat, and to control systems outside of the vehicle like the control of a kiosk located outside of the car, etc. US Patent Applications 2018/0336007, 2018/0292829, 2018/0374002, 2020/0319644, and 2020/0327317 describe using hand gestures by a person outside of the vehicle to hail it to stop—typically for the application of calling for autonomous taxis. US Patent Application 2021/0224527 describes employing gesture recognition to determine authorization of a person to access the autonomous vehicle. Examples include autonomous taxi hailing and request for entry.

However, none of the above prior patent references describe using gesture recognition to (1) authenticate the authority of the person directing the autonomous vehicle to behave in certain ways, or (2) recognition of gesture to implement or command specific vehicle behaviors to support manually direct traffic flow.

SUMMARY OF THE INVENTION

This invention improves upon autonomous vehicle (AV) control by providing the ability to sense a command from a source external to the vehicle and modify the behavior of the vehicle in accordance with the command. For example, the AV may have a camera in communication with a processor operative to visualize a police officer or other person associated with traffic control and interpret gestures made by the person causing the vehicle to stop, slow down, pull over, change lanes, back up or take a different route due to unplanned traffic patterns such as accidents, harsh weather, road closings or other situations. The system and method may also be used for non-emergency purposes, including external guidance for load pick-up/placement, hailing a vehicle used as a cab, and so forth.

An AV applicable to the invention comprises a mobile platform with wheels and controls for steering, speed and braking. One or more sensors on the platform assist with vehicle location sensing and object or collision avoidance; one or more memories on the platform store maps and mission plans; and one or more processors on the platform execute the mission plans by controlling the steering, speed and braking using the stored maps and inputs from the sensors. Unique to the invention, however, the processor is further operative to sense a command from a source external to the vehicle using one or more of the sensors and temporarily or permanently modify the behavior of the vehicle in accordance with the command.

The command may be a hand or body gesture made by a person external to the vehicle; a command spoken by a person external to the vehicle; a radio frequency (RF) command generated by a person external to the vehicle; and/or may include light or energy generated by a person external to the vehicle.

The command may relate to passenger or object loading, unloading or staging, and/or the command may be generated by a police office or other authorized person, causing the vehicle to stop, slow down, pull over, back up or take a route different from one contained in a mission plan.

DETAILED DESCRIPTION OF THE PREFERRED EMBODIMENTS

This invention is directed to a system and methods for tracking people external to an autonomous vehicle (ground, water, air, or other) and controlling behaviors of that vehicle based on position, motion, and/or body and hand gestures of the person external to the vehicle. One example would be to control an autonomous vehicle at an intersection controlled by a police officer through the use of body and hand gestures. Another would be to control the autonomous vehicle around an accident or construction site. Yet another would be to control autonomous traffic of military vehicles by military hand gestures (at intersections, along roadways, or at depots or bases). The system here identifies a person and tracks the person in the immediate proximity of the autonomous vehicle and use their position and motions to control specific behaviors of the vehicle, such as stopping, proceeding, maneuvering around a restricted zone (like an accident site), or executing a turnabout to replan the autonomous vehicle route.

A generic interactive gesture command system for an autonomous vehicle system might include the following components (described in detail below):

1. One or more optical video motion capture cameras (or other sensing system like LADAR) located on the vehicle to view the person.
2. A person recognition systems that identifies a person outside of the autonomous vehicle based on localization of person's head, body, other body parts, and any insignia, badges, or other identification markers that can be used to authenticate the authority of the person being observed (such as a police, construction, or military uniform).
3. A tracking system for tracking motion of a person's head, body, and other body parts.
4. A gesture/behavior recognition system for recognizing and identifying a person's motions and intent.
5. Algorithms for initiating or controlling the autonomous vehicle's behaviors, or sets of movement and/or stopping actions executed by the vehicle based on the gesture recognized in step 4, whether the vehicle is under active or passive control by a vehicle occupant.
6. Augmentation of the system by an RF remote held by the person outside of the vehicle in communications to the vehicle communicating through a Vehicle to Pedestrian communication link. This link might include authentication of the authorization of the outside-vehicle person to command the autonomous vehicle or might also include specific commands to the vehicle selected by the person communicated through the link.

The Autonomous Vehicle

Figure 1:
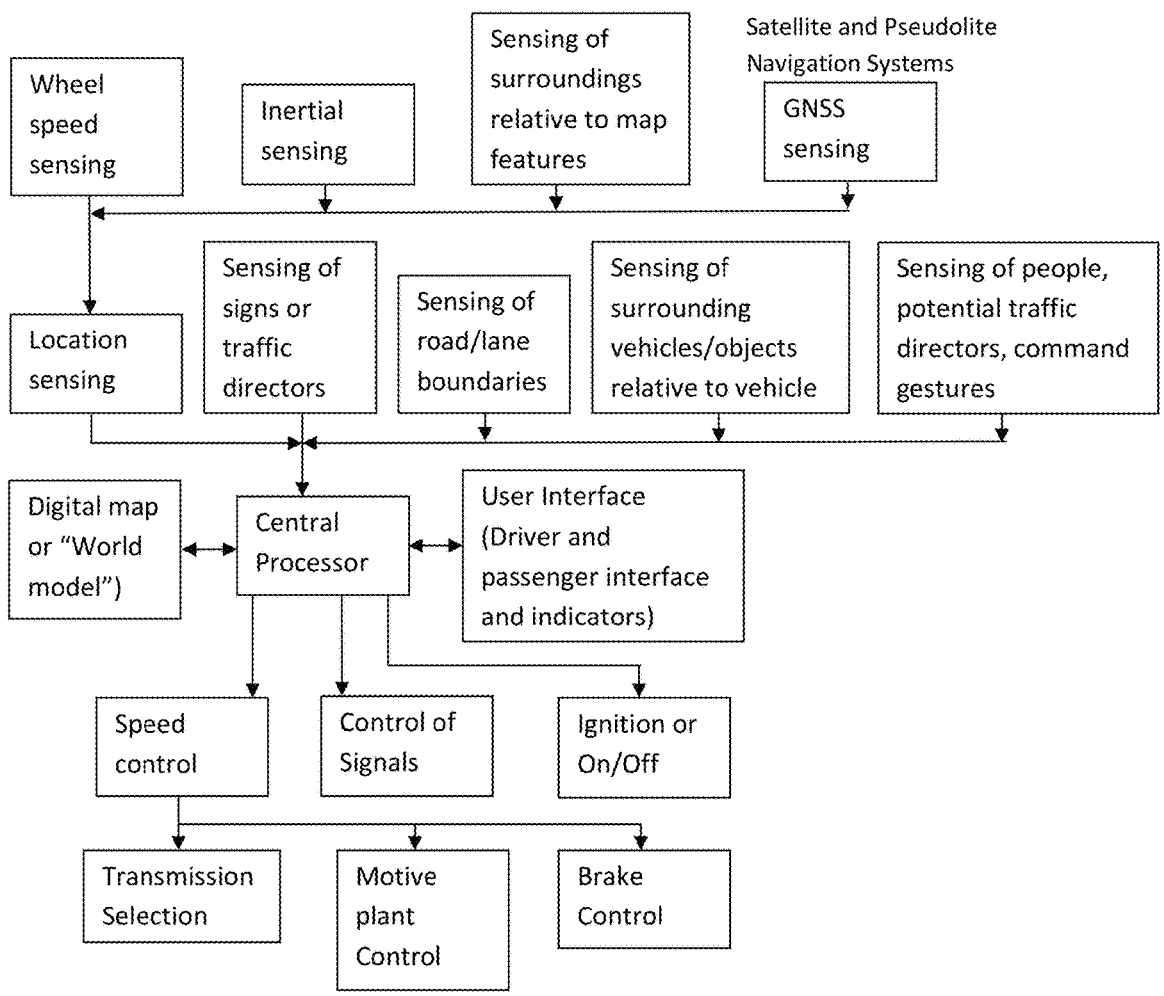
FIG. 1 is a typical autonomous vehicle architecture.

FIG. 1 shows a typical autonomous vehicle architecture which includes computer controlled driving functions: ignition (vehicle on/off more generally to encompass electrified vehicles) steering, braking, transmission selection, signals, head and tail lights, and some means to identify when the vehicle is in autonomous driving mode. These systems are controlled by one or more processors that may also read and interpret sensors such as LADAR or 3D cameras to detect and respond to roadway obstacles or barriers, 2D cameras to read road signs, identify lanes, and detect pedestrians, or other vehicles, proximity sensor to detect close approaches to obstacles or barriers. Note that pseudolite is this context may be taken to mean any kind of RF ranging or locating system that is not GPS or satellite based, and that GNSS is any kind of satellite-based Global Navigational Satellite System.

Figure 2:
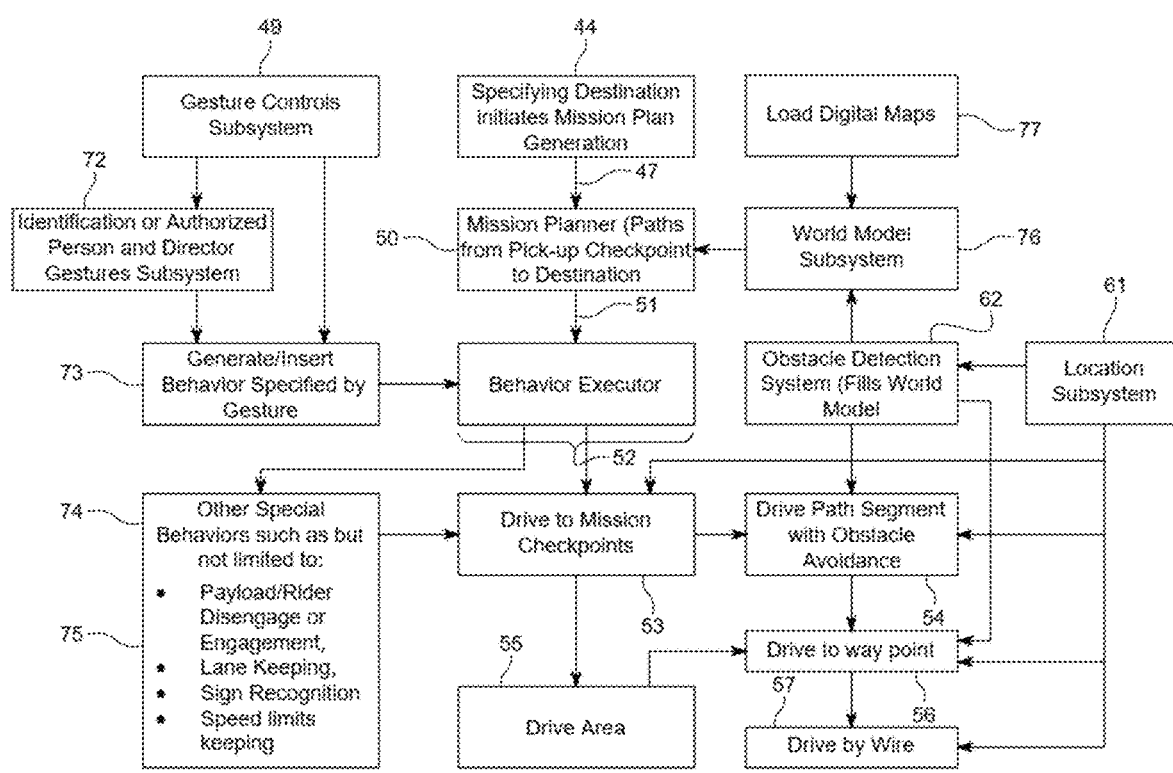
FIG. 2 is depicts a processor/process architecture executing in an autonomous vehicle architecture.

FIG. 2 is depicts a processor/process architecture executing in an autonomous vehicle architecture including gesture recognition according to the invention. The specification of a destination initiates the generation of a mission plan at 44. Following path 47, the mission planner defines paths from a pick-up checkpoint to a destination at 50. Digital maps are loaded at 77, feeding a world model subsystem at 76, which in turn feeds mission planner 50.

A location subsystem 61 interacts with obstacle detection system 62 that feeds world model subsystem 76. Location subsystem 61 and obstacle detection system 62 also feed a drive path segment with obstacle avoidance block 54, and block 54 and obstacle detection system 62 also feed block 56 operative to drive to a way point 56. Location subsystem 61 and block 56 also feed a drive by wire block 57. Bock 53 also interacts with drive area block 55 and drive path segment 54.

Gesture controls subsystem 49 is operative to generate or insert a specific behavior specified by gesture 73. Prior to the operation of block 73, the system may identify or authorize a person to direct the gestures system. The output of block 73 feeds block 52, wherein the behavior from mission planner 50 is executed, following path 51. Behavior executor 52 further forms one input block 53 operative to drive to mission checkpoints. Behavior executor 52 additionally enables other special behaviors including, but not limited to payload/rider engage/disengage; lane keeping; sign recognition; and speed limit observance.

Continuing the reference to FIG. 2, within the processor (or processors interconnect to sensors, vehicle controls, and each other) are processes that (a) interpret sensor data, (b) build a dynamic and constantly changing "world model" of the environment and objects in the near proximity of the autonomous vehicle, (c) track vehicle location (relative to world or map coordinates), (d) identify barriers and obstacles, (e) read road signs and other traffic controls, (f) identify lane boundaries and the vehicle position within them, (g) integrate location and the local "world model" with a larger electronic map of roads and traffic merge points (merges and intersections), offer a driver and or passenger interface to communicate driver commands to the vehicle and vehicle status and state to the driver or passenger, and (h) a path planning and path driving process that can accept destination locations and generate drive paths to take the vehicle from its current location to each destination in sequence. While executing the drive path plan, the vehicle execution process monitors location, objects (which might be people or vehicles or static barriers obstacles), and makes changes as needed in the drive path to maintain forward progress while also maintaining vehicle and passenger safety (for instance, avoid obstacles or obeying traffic controls and rules as the driving process proceeds).

In general, driving rules, path planning, and drive execution are implemented as a number of "behaviors" executed by the control processor because may different functions to be performed might occur simultaneously—for instance a turn involves (a) checking the electronic map to see if the turn is allowed, (b) checking the projected drive path to make sure that the turn is safe to make (determine that no other vehicles or barriers are obstacles in the way preventing the turn), (c) obeying traffic controls so that the motion through opposing traffic is allowed at that time, and (d) controlling signals to indicate the turn. Depending on the autonomous drive task requirements and the environment around the vehicle, different combinations of behaviors may be actively operating.

Autonomous applications with special tailoring might include large road trucking where the autonomous vehicle may have behaviors to make way stops at loading, unloading, and staging points. An autonomous taxi might have specialized behaviors to respond to being hailed by a potential rider, to collect fares for the ride, and to only make pick-ups and drops at allowed areas (for instance at many airports, only the designated taxi service can pick-up and drop at the terminals). Other behaviors may be directed from outside the vehicle by an authorized person, such as police, to accomplish traversal through manually controlled traffic patterns.

Figure 3:
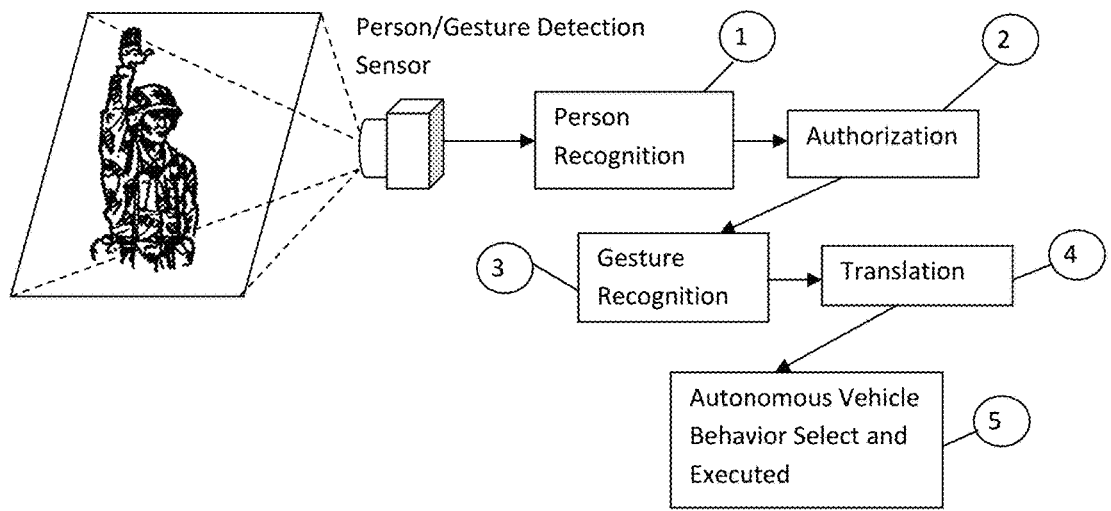
FIG. 3 illustrates the interpretation of gestures to direct vehicle behaviors (to be executed by the vehicle architecture)

FIG. 3 illustrates a subsystem for interpreting gestures to direct vehicle behaviors (to be executed by the vehicle architecture). A sensor or sensors such as a video camera feeds a person recognition block 1, followed by authorization at 2. Gesture recognition is performed at 3, with gesture translation occurring at 4. Following translation, autonomous vehicle selection and execution is carried out at 5.

More specifically with reference to FIG. 3, behaviors are cued by identifying the person in authority, capturing and identifying the meaning of specific gestures, and then taking the proper autonomous driving action (behavior) to obey the authorities gesture command. Example commands include but are not limited to stop, slow down, and detour. A more fully defined set of gestures can be found in Visual Signals, U.S. Army Field Manual No. 21-60, incorporated herein by reference, though alternative gestures to command mappings may be implemented as well.

The Person and Gesture Sensing System

A video camera or alternative sensor like LADAR is used to identify a person in or near the roadway (direction of autonomous vehicle travel). This is readily accomplished using methods described in U.S. Pat. Nos. 6,681,031, 6,950,534, 7,036,094, 7,460,690, 7,668,340, 8,407,625, and 9,304,593 and in Papageorgiou 2000, Dalal 2005, Bo 2005, Mikolajczyk 2005, Hyunggi 2005, Barnich 2006, Pierard 2010 and 2011, all incorporated herein by reference. Once the person has been found, the camera or alternative sensor tracks the person's movement during the activity, in the same manner a camera tracks a person's movement in the patents referenced above. Other alternative tracking systems may be used. These cameras can be mounted anywhere within the vehicle, but are likely to be the same sensors used for autonomous lane keeping, roadside sign reading, and detection of stop lights.

Gesture Tracking System

The gesture tracking system of FIG. 3 embodies the algorithms for using the camera (or other sensing data) to track a person's hand, body, or body parts. This is detailed in U.S. Pat. Nos. 6,681,031, 6,950,534, 7,036,094, 7,460,690, 7,668,340, 8,407,625, and 9,304,593, all incorporated herein by reference. The tracking may be derived from one or multiple sensing systems, with return positions in two or three-dimensional space.

Gesture/Behavior Recognition

Figure 4:
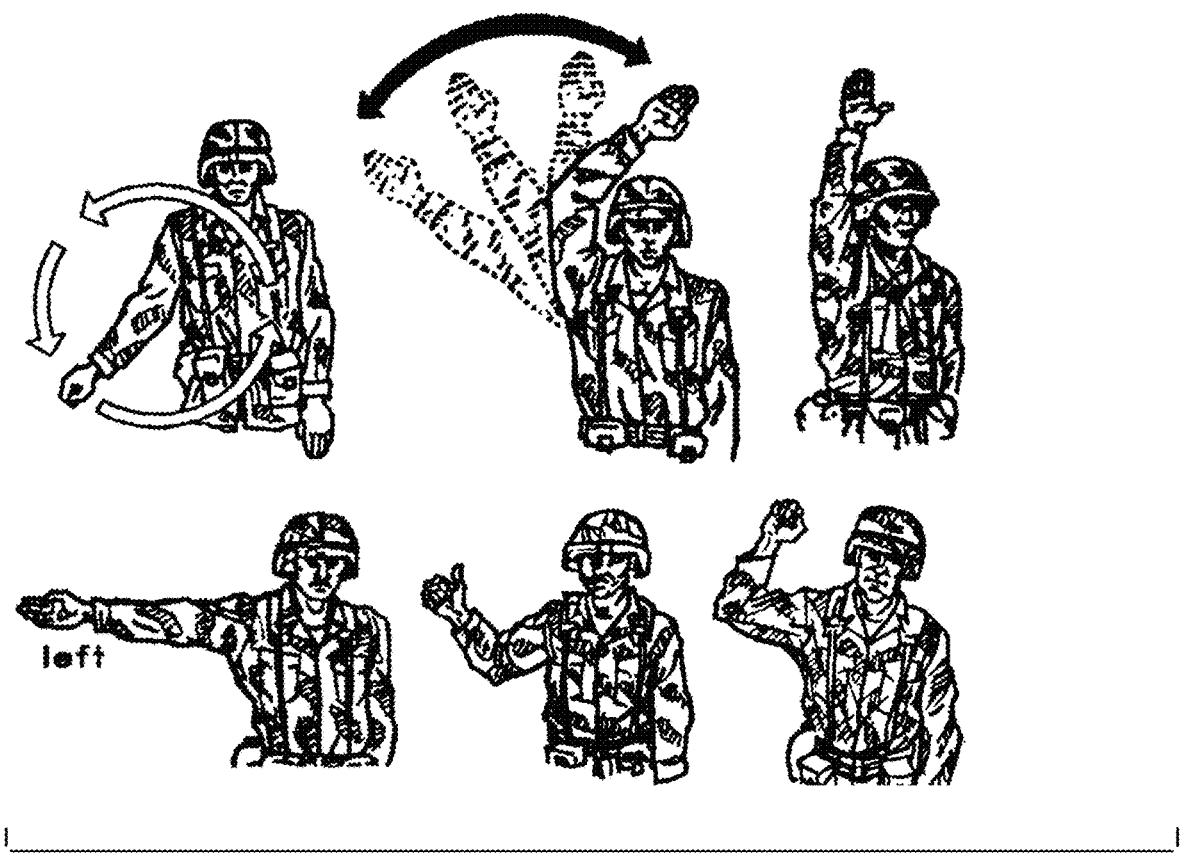
FIG. 4 shows the movement control hand gestures described in U.S. Army Field Manual No. 21-60 and U.S. Pat. No. 9,304,593 (FIGS. 9-14) and its antecedents.

The tracked motions are converted into gestures and behaviors. These behaviors are then identified as autonomous vehicle commands to be executed according to the meaning of each command identified. Examples of gestures for controlling autonomous vehicles through manually controlled traffic areas are shown in FIG. 4.

Control Algorithms

The system then use the position and gesture information to control various autonomous vehicle behaviors like stop, move forward, turn left of right, etc. (also see gestures in FIGS. 3, 4).

Alternate Embodiments

This autonomous vehicle control by gestures can also be implemented through hand-held command stations that an authorized traffic control manager (such as a policeman) might use. Commands keyed into the command station might use various communication methods (V2V or vehicle-to-vehicle RF systems, other RF wireless, optical, ultrasonic emissions, etc.) to communicate the command authority and the specific command to the autonomous vehicle.

Figure 5A:
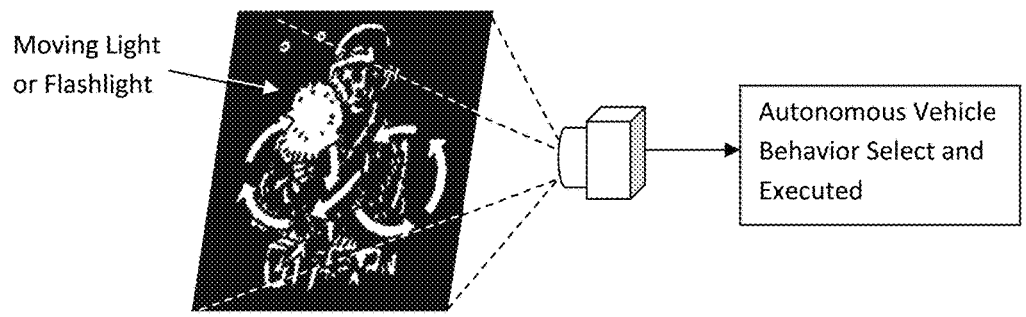
FIG. 5A illustrates the alternative use of external lights to control autonomous vehicle behavior.
Figure 5B:
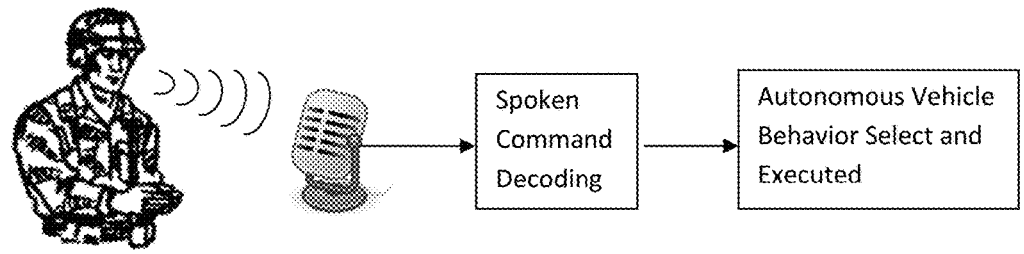
FIG. 5B illustrates the alternative use of voice response to control or influence vehicle behavior; that is, voice Response (Computer decoding of person(s) in authority using verbal commands—i.e., using ALEXA type technology)
Figure 5C:
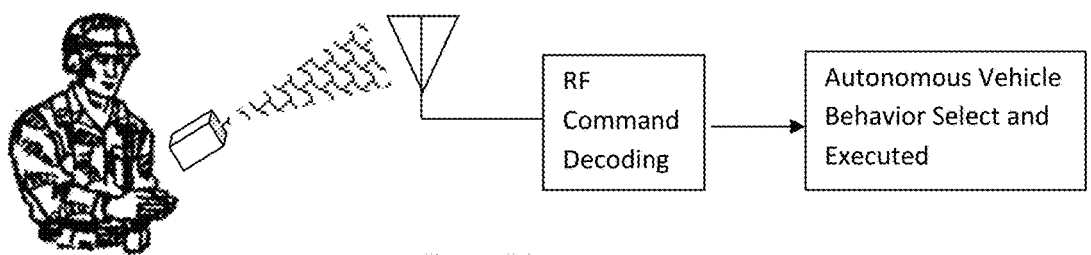
FIG. 5C depicts the alternative use of Vehicle-to-Vehicle (V2V) Police-to-Vehicle (other types of) radio control commands.
Figure 5D:
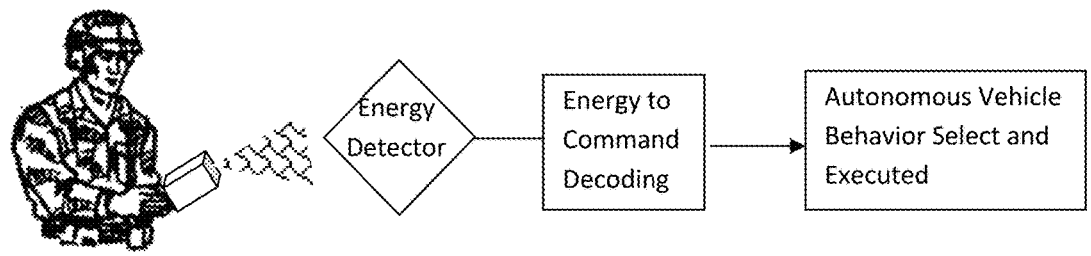
FIG. 5D shows other transmission means (infrared, optical or ultrasonic emissions or energy) to control or influence autonomous vehicle behavior.

FIG. 5A illustrates the alternative use of external lights to control autonomous vehicle behavior. FIG. 5B illustrates the alternative use of voice response to control or influence vehicle behavior; that is, voice Response (Computer decoding of person in authorities verbal commands—using ALEXA type technology); FIG. 5C depicts the alternative use of Vehicle-to-Vehicle (V2V) Police-to-Vehicle (other types of) radio control commands; and FIG. 5D shows other transmission means (infrared, optical or ultrasonic emissions or energy) to control or influence autonomous vehicle behavior.

The invention claimed is:

1. An autonomous vehicle, comprising:
   a mobile platform with wheels and controls for steering, speed and braking;
   one or more sensors on the mobile platform to assist with vehicle location sensing and object or collision avoidance;

one or more memories on the mobile platform for storing maps and mission plans;

one or more processors on the mobile platform operative to execute the mission plans by controlling the steering, speed and braking using the stored maps and inputs from the one or more sensors; and wherein the one or more processors are further operative to sense a command from a source external to the autonomous vehicle using one or more of the sensors and, in response to authenticating the external source as an authorized entity, to temporarily or permanently modify the behavior of the autonomous vehicle in accordance with the command;

wherein the command is a gesture made by the source;

wherein the command is generated by a police office or other authorized person, causing the autonomous vehicle via the one or more processors to stop, slow down, pull over, back up or take a route different from one contained in the mission plan.

2. The autonomous vehicle of claim 1, wherein the command is a hand or body gesture made by the source external to the autonomous vehicle.

3. The autonomous vehicle of claim 1, wherein the command is spoken by the source external to the autonomous vehicle.

4. The autonomous vehicle of claim 1, wherein the command is a radio frequency (RF) command from a RF remote operated by the source external to the autonomous vehicle.

5. The autonomous vehicle of claim 1, wherein the command includes light or energy operated by the source external to the autonomous vehicle.

6. The autonomous vehicle of claim 1, wherein the one or more processors are further operative to identify and match the gesture made by the authorized entity and modify the behavior of the autonomous vehicle if the recognized gesture corresponds to a valid command.

7. The autonomous vehicle of claim 1, wherein the external source is authenticated based at least in part on insignia, badges, or other identification markers.

8. A method for operating an autonomous vehicle including a mobile platform with wheels and controls for steering, speed and braking, the method comprising:

sensing, via one or more sensors on the mobile platform, vehicle location and objects or potential collisions to avoid;

storing, in one or more memories on the mobile platform, maps and mission plans;

executing, via one or more processors on the mobile platform, the mission plans by controlling the steering, speed, and braking using the stored maps and inputs from the one or more sensors; and sensing, via the one or more processors and one or more sensors, a command from a source external to the autonomous vehicle and, in response to authenticating the external source as an authorized entity, to temporarily or permanently modify the behavior of the autonomous vehicle in accordance with the command;

wherein the command is a gesture made by the source;

wherein the command is generated by a police officer or other authorized person and causes via the one or more processors the vehicle to stop, slow down, pull over, back up, or take a route different from one contained in the mission plan.

9. The method of claim 8, wherein the command is a hand or body gesture made by the source external to the autonomous vehicle.

10. The method of claim 8, wherein the command is spoken by the source external to the autonomous vehicle.

11. The method of claim 8, wherein the command is a radio frequency (RF) command from a RF remote operated by the source external to the autonomous vehicle.

12. The method of claim 8, wherein the command includes light or energy operated by the source external to the autonomous vehicle.

13. The method of claim 8, further comprising identifying and matching, via the one or more processors, the gesture made by the authorized entity and modifying the behavior of the autonomous vehicle if the recognized gesture corresponds to a valid command.

14. The method of claim 8 wherein the external source is authenticated based at least in part on insignia, badges, or other identification markers.

\* \* \* \* \*